US009548775B2

(12) United States Patent
Smith (10) Patent No.: US 9,548,775 B2
(45) Date of Patent: Jan. 17, 2017

(54) MITIGATION OF TRANSMITTER PASSIVE AND ACTIVE INTERMODULATION PRODUCTS IN REAL AND CONTINUOUS TIME IN THE TRANSMITTER AND CO-LOCATED RECEIVER

(76) Inventor: Francis J. Smith, Park City, UT (US)

( * ) Notice: Subject to any disclaimer, the term of this patent is extended or adjusted under 35 U.S.C. 154(b) by 730 days.

(21) Appl. No.: 12/851,510

(22) Filed: Aug. 5, 2010

(65) Prior Publication Data

US 2011/0075754 A1    Mar. 31, 2011

Related U.S. Application Data

(63) Continuation-in-part of application No. 11/851,185, filed on Sep. 6, 2007, now Pat. No. 7,773,967.

(51) Int. Cl.
*H04B 1/10*    (2006.01)

(52) U.S. Cl.
CPC .................................. *H04B 1/109* (2013.01)

(58) Field of Classification Search
USPC ....... 455/296–312, 114.1–114.3, 67.13, 63.1
See application file for complete search history.

(56) References Cited

U.S. PATENT DOCUMENTS

| | | | |
|---|---|---|---|
| 4,028,622 A * | 6/1977 | Evans ....................... | H04B 3/46 324/623 |
| 4,954,790 A * | 9/1990 | Barber ................. | H03D 9/0633 332/164 |

(Continued)

*Primary Examiner* — Edward Urban
*Assistant Examiner* — Rui Hu
(74) *Attorney, Agent, or Firm* — Blakely, Sokoloff, Taylor & Zafman LLP (57) ABSTRACT

A transmitter channel interference mitigation processing method for cancellation of intermodulation products are described. In one embodiment, a method comprising generating continuous and real time IMP cancellation signals (ICS) in the baseband digital signal set of the transmitter based on a transmitter signal set, combining digital IMP cancellation signals with a digital baseband transmitter signal set such that the digital cancellation signals, when converted to analog signals and transmitted as part of an analog transmitter signal set, are cancelled by and so cancel the IMPs generated by the non-linear components in the analog transmitter hardware, including digitally generating the IMP cancellation signals using a process based on a power series description of a non-linear process generating the IMPs, generating $3^{rd}$ order IMP cancellation signals by digitally multiplying two or three signals of the transmitter signal set to create $3^{rd}$ order IMP cancellation signals, generating $5^{th}$ order IMP cancellation signals by digitally multiplying two or three or five signals of the transmitter signal set to create $5^{th}$ order IMP cancellation signals, generating $7^{th}$ order IMP cancellation signals by digitally multiplying two or three or five or seven signals of the transmitter signal set to create $7^{th}$ order IMP cancellation signal, generating odd order IMP cancellation signals (ICS) by digitally multiplying an odd number of digital signals and combining multiplied digital signals with the transmitter baseband digital signals, creating IMP cancellation signals in the receiver, and cancelling one or both of active and passive IMPs generated in a transmitter path that fall within a receiver passband.

40 Claims, 6 Drawing Sheets

(56) References Cited

U.S. PATENT DOCUMENTS

| | | | | |
|---|---|---|---|---|
| 5,754,536 A * | 5/1998 | Schmidt | H04J 3/14 | 370/330 |
| 5,757,246 A * | 5/1998 | Johnson | H01Q 1/246 | 333/12 |
| 6,549,067 B1 * | 4/2003 | Kenington | H03F 1/3247 | 330/149 |
| 7,170,342 B2 * | 1/2007 | Suzuki | H03F 1/3258 | 330/149 |
| 7,196,576 B2 * | 3/2007 | Mizuta | H03F 1/3247 | 330/151 |
| 7,346,134 B2 * | 3/2008 | Smith | H04B 1/123 | 375/346 |
| 7,672,395 B2 * | 3/2010 | Mizuta | H03F 1/3241 | 330/149 |
| 7,724,840 B2 * | 5/2010 | McCallister | H03F 1/3247 | 330/149 |
| 7,773,967 B2 * | 8/2010 | Smith | H04B 1/30 | 455/114.1 |
| 7,876,867 B2 * | 1/2011 | Filipovic | H04B 1/109 | 375/343 |
| 7,907,678 B2 * | 3/2011 | Mizuta | H03F 1/3258 | 330/149 |
| 8,170,487 B2 * | 5/2012 | Sahota | H04B 1/525 | 455/296 |
| 8,290,100 B2 * | 10/2012 | Komninakis | H04B 1/10 | 324/76.23 |
| 8,300,561 B2 * | 10/2012 | Elahi | H04L 5/1423 | 370/278 |
| 8,320,866 B2 * | 11/2012 | Pratt | H04B 1/525 | 375/346 |
| 8,320,868 B2 * | 11/2012 | Pratt | H04B 1/525 | 375/346 |
| 8,855,580 B2 * | 10/2014 | Dent | H04B 1/525 | 455/114.2 |
| 8,879,663 B1 * | 11/2014 | Haddadin | H04B 1/0475 | 375/295 |
| 8,890,619 B2 * | 11/2014 | Wyville | H04B 1/109 | 327/156 |
| 8,995,932 B2 * | 3/2015 | Wyville | H04B 1/525 | 330/149 |
| 9,026,064 B2 * | 5/2015 | Wang | H04B 1/109 | 330/49 |
| 2003/0232600 A1 * | 12/2003 | Montgomery | H01Q 1/246 | 455/67.11 |
| 2004/0116083 A1 * | 6/2004 | Suzuki | H03F 1/3258 | 455/126 |
| 2004/0189378 A1 * | 9/2004 | Suzuki | H03F 1/0288 | 330/52 |
| 2005/0189990 A1 * | 9/2005 | Mizuta | H03F 1/3247 | 330/52 |
| 2007/0184782 A1 * | 8/2007 | Sahota | H04B 1/525 | 455/63.1 |
| 2007/0217488 A1 * | 9/2007 | Smaini | H04B 1/525 | 375/219 |
| 2008/0144709 A1 * | 6/2008 | McCallister | H03F 1/3247 | 375/233 |
| 2008/0187035 A1 * | 8/2008 | Nakamura | H03F 1/0288 | 375/232 |
| 2009/0185510 A1 * | 7/2009 | Elahi | H04B 17/10 | 370/277 |
| 2009/0325509 A1 * | 12/2009 | Mattisson | H04B 1/525 | 455/75 |
| 2010/0093298 A1 * | 4/2010 | Pratt | H04B 17/21 | 455/226.1 |
| 2010/0136925 A1 * | 6/2010 | Lackey | H04B 1/123 | 455/77 |
| 2011/0149714 A1 * | 6/2011 | Rimini | H04B 1/525 | 370/201 |
| 2011/0195673 A1 * | 8/2011 | Pratt | H04B 1/525 | 455/78 |
| 2011/0235748 A1 * | 9/2011 | Kenington | H03F 1/3247 | 375/296 |

* cited by examiner

FIG. 4  The Transmitter Architecture Mitigates the Non-linear Distortion from the HPA allowing the Transmitter to be Operated at or Near Saturation with Multiple Carriers and Multiple Amplitude Signals while Meeting Out of Band Emission Requirements

FIG. 5

FIG. 6 Full Duplex Ground Terminal With Passive and Active IMP Suppression in the Transmitter/Receiver

MITIGATION OF TRANSMITTER PASSIVE AND ACTIVE INTERMODULATION PRODUCTS IN REAL AND CONTINUOUS TIME IN THE TRANSMITTER AND CO-LOCATED RECEIVER

CROSS-REFERENCE TO RELATED APPLICATIONS

This is a continuation-in-part of application Ser. No. 11/851,185, filed Sep. 6, 2007 now U.S. Pat. No. 7,773,967, which is now U.S. Patent Publication No. 2009/0068974 published Mar. 12, 2009, and is incorporated herein by reference.

FIELD OF THE INVENTION

The field of the invention relates to the field of radio receivers and nonlinear transmitters. More specifically, the invention relates to the mitigation of non-linear intermodulation product distortions and interference in continuous and real time via processes in the transmitter and the co-located receiver(s).

BACKGROUND OF THE INVENTION

Terms and Definitions a.) IMP—Intermodulation Product(s)
b.) Source Signals—Signals that mix in non-linear devices to create new and undesirable signals called intermodulation products or IMP
c.) IF—intermediate frequency
d.) RF—radio frequency
e.) AM/AM—amplitude to amplitude modulation
f.) AM/PM—amplitude to phase modulation
g.) Active IMPs—signals created in active non-linear devices usually with gain
h.) Passive IMPs—signals created in passive components, usually created by imperfections in physical characteristics of items like waveguides, typically components without gain
i.) G/T—gain to noise temperature ratio, typically given in dB
j.) EIRP—effective isotropic radiated power; power transmitted times the antenna gain
k.) Notch Filter—a filter that removes the energy from a selected pass band—noted here to clarify that this invention does not use notch filters to remove IMPs.
l.) Direct Cancellation—technique used in this invention to suppress IMP signals by direct cancellation of the interfering signal without removing energy from the signal of interest.
m.) SOI—signal of interest—the signal or signals that are to be recovered by the system or transmitted by the system. Sometimes the SOI is referred to as target signal.
n.) SLRG—side lobe re-growth
o.) OOBE—out of band emissions
p.) SNR—signal to noise ratio
q.) SINR—signal to interference plus noise ratio
r.) TWTA—traveling wave tube amplifier
s.) SSPA—solid State Power Amplifier
t.) HPA—high power amplifiers
u.) LNA—low noise amplifier
v.) ICS—IMP cancellation signal
w.) PAE—power added efficiency, the ratio of the input prime power to the amplifier output power.
x.) IP3—third order intercept point
y.) IIP3—third order intercept point referenced to the input of the amplifier, in dBm
z.) OIP3—third order intercept point referenced to the output of the amplifier, in dBm
aa.) IMP3—third order IMP in dBmab.)
ab.) IIMP3—input third order IMP in dBm, referenced to the input of the amplifier
ac.) OIMP3—output third order IMP in dBm, referenced to the output of the amplifier
ad.) ISP1—input signal power in dBm of the source signal used once in the creation of the IMP3
ae.) ISP2—input signal power in dBm of the source signal used twice in the creation of the IMP3
ad.) MSBs—most significant bits
af.) LSBs—least significant bits

BACKGROUND

Satellite communications systems are typically high power transmission systems, often requiring transmitter back off to near linear operation to prevent the generation of intermodulation products (IMPs), side lobe re-growth (SLRG) and out of band emission (OOBE), especially when operating in a multi-carrier scenario.

The capacity of satellite communications channels is limited by the bandwidth of the channel and the EIRP-G/T product of the transmitter and receiver sensitivity, the available SNR or the SNIR if we include the IMP and other interference. Satellite to Satellite, Satellite to Ground and Ground to Satellite communications systems are typically high power systems with transmit high power amplifiers (HPA) operating at 50 to few hundred watts. In some cases, kilowatt transmitters may used.

HPAs, TWTAs and multi-module SSPAs and LNAs, are non-linear devices and can all generate active IMPs. When these devices are linearized, the result is often a 3 to 4 dB reduction in output power. This is often only an approximation to linearity and the IMP issue is not totally mitigated. The less the required back-off of the amplifier, the greater the available transmitter power, and the greater will be the channel capacity and power added efficiency (PAE).

To accommodate multi-carrier operation, systems often require transmitter back off to near linear operation to preclude the generation of intermodulation products (IMPs) and to prevent side lobe re-growth and out of band emissions. Given systems with narrow guard bands between transmit and receive bands, transmitter feed thru and passive/active IMPs, generated in the transmitter, can preclude multi-carrier operation.

Transmitter feed thru can also be created as a third order IMP in cell phones with when signals mix.

DETAILED DESCRIPTION OF THE INVENTION

The IMP (Intermodulation Products) cancellation techniques contained in patent application Ser. No. 11/851,185, filed Sep. 6, 2007, which is now U.S. Patent Publication No. 2009/0068974 published Mar. 12, 2009 and those in this patent application are fundamentally the same, to include the Passive and Active IMPs produced by the high power transmitter and mitigated in both the transmitter and the receiver. In all the cases discussed, digital copies of the signals that create the intermodulation products are isolated and multiplied in the time domain digital sample by sample to create a copy of the interfering signal and this signal is used to cancel the IMPs in real and continuous time.

A previous patent application Ser. No. 10,603,798 (Jun. 24, 2003) is discussed herein and is an invention to mitigate non-linear AM/AM and AM/PM distortion and signal clipping which results in side lobe regrowth. This references herein are used to describe how the IMP cancellation and the AM/AM and AM/PM distortion and interference mitigation can be implemented together.

While all of the techniques described herein can be implemented either at baseband I and Q or some composite digital IF signal, the composite IF is described due to implementation efficiency. The techniques described herein are readily implementable at I and Q baseband as will be readily recognized by one versed in the arts.

Embodiments of this invention are described in conjunction with a satellite communications system. This is not intended to limit this invention to satellite systems. As will be recognized by one versed in the art, this invention is applicable to any amplifier and extends to, but is not limited to, terrestrial communications, wired and cable systems, wireless mobile terminals and base stations, commercial and military applications, local area communications (wireless LAN), wireless offices, air to air, air to ground, ground to air, satellite to satellite, satellite to ground and ground to satellite communications.

This invention provides the capability to suppress the passive/active IMPs by 20+dB and when implemented with invention (patent application Ser. No. 10/603,798, filed Jun. 24, 2003) prevents SLRG and non-linear AM/AM and AM/PM distortion in the transmitter to include multi-amplitude signals operating near saturation. In the receiver, this invention will suppress receiver generated IMPs and active and passive IMPs from transmitters.

This invention can allow transmitter back off to be reduced by 6+dB or more reducing the required HPA size by a factor of 4 or more while supporting multi-carrier operations. The technology can also mitigate IMPs caused by high powered co-located transmitters. The technology is modulation and device agnostic and can cancel IMPs without canceling energy in the signal of interest (SOI). This invention is adaptive and self converging.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Embodiments of the invention provides the capability to suppress the passive/active IMPs by 20+ dB in both the transmitter and the receiver. This technology can allow transmitter to be operated at 6 dB+ higher power or with an amplifier ¼ the size, or a parabolic antenna ½ the size. As one versed in the art will recognize, the invention can produce greater IMP suppression and support less back off in the amplifiers.

The technology can mitigate IMPs caused by high power co-located transmitters. The architectures presented herein, covering the transmitters and receivers and the various interference/distortion mitigation techniques, can be implemented individually or all simultaneously.

The IMPs are suppressed with a direct cancellation technique in the digital domain. Copies of the signals that create the IMPs (called source signals) are acquired and isolated in real time and are then used to create an IMP cancellation signal (ICS) which is used to cancel the IMPs in continuous and real time in both the transmitter and the receiver.

The IMPs can be superimposed and or overlapping in frequency with each other or the signals of interest. Multiple IMPs can be cancelled simultaneously even if they overlap in frequency. IMPs can be cancelled even if they are wider in frequency bandwidth and at a power level much higher than the signal of interest.

With this invention, multiple IMPs can be cancelled simultaneously because all IMPs are uncorrelated even though they may not be independent, even if they have a common source signal. The IMPs can be at the same frequency and have different bandwidths and can be wider and higher power than the SOI.

In the transmitter, the amplifier can be operated at approximately 1 dB higher output level for each 3 dB reduction in the IMPs power level. This allows the transmitter back off to be a reduced by 1 dB for each 3 dB suppression of the IMPs without exceeding the IMP generation specification of the system.

For each bit of accuracy in the IMP cancellation process, 6 dB suppression of the IMP is realized. For each dB of suppression of the IMPs, the receiver sensitivity is improved dB for dB down to the noise floor of the receiver or, in the transmitter, the transmitter back off is reduced by 2 dB.

Overall Description of Interference and Mitigation

IMPs can result from several sources and all of the IMPs are suppressed in a similar fashion. The IMPs can impact several receivers in different configurations associated with one or multiple transmitters.

In the example discussed herein (X-Band MILSATCOM), there are many users in the allocated satellite uplink and downlink pass bands. The SATCOM systems are heavily oversubscribed and preventing interference between users is critical. This requires that out of band emissions (OOBE) and IMPs be carefully controlled.

Controlling side-lobe re-growth and IMPs often requires operating transmitters in the linear mode and often with only single carriers. The invention presented herein provides the capability to operate transmitters in a highly non-linear region while controlling OOBE and IMPs and thus significantly improving system efficiency and capacity.

The interference environment with multiple transmitters and receiver is complicated and thus some definitions are in order.

DEFINITIONS

1. Self communications terminal: The receiver and transmitter of the target system (central system to discussion)(also referred to as the self terminal)
2. Companion transmitter: Transmitter associated with the companion receiver of the self communications terminal
3. Companion receiver: Receiver associated with the companion transmitter of the self communications terminal
4. Co-located receiver: A receiver located in the vicinity of the self communications terminal, but not associated with the self terminal
5. Co-located transmitter: A transmitter located in the vicinity of the self terminal, but not associated with the self terminal
6. Other terminals: Terminals not co-located, but potentially impacted by or impacting the self terminal The Impacted Receivers are:
1. Companion receiver (receiver associated with the self transmitter)
2. Co-located receiver (co-located receiver that is not associated with the self terminal)
3. Other ground SATCOM receivers using the satellite to ground receiver channels
4. Satellite (on orbit) receivers with multiple uplink and downlink channels The IMP Sources are the Following:
1. Active high power IMPs generated in the HPA falling in the transmit band of self terminal
2. Active high power IMPs generated in the HPA falling in the companion receiver band of the self terminal
3. Passive IMPs generated in the waveguide and other passive components, between the transmitter filter and the antenna feed, of the transmitter falling in the transmit band of self terminal
4. Passive IMPs generated in the waveguide and other passive components, between the transmitter filter and the antenna feed, of the transmitter falling in the companion receiver band of the self terminal
5. Active IMPs generated in the receiver from extraneous high power signals in the receiver band from any source
6. Active IMPs generated in co-located high power transmitters
7. Passive IMPs generated in co-located high power transmitters
8. IMPs generated in the receiver by mixing of receiver band signals with high power transmitter noise floor in the receiver band of self terminal
9. Cross modulation of transmitter signals falling into receiver bands such as in cellular telephony systems like CDMA In each of the cases identified here, in embodiments of the invention, the IMPs will be actively cancelled by creating a copy of the IMP digitally and canceling the system generated IMPs in real and continuous time. This is accomplished by extracting and isolating copies of the signals that create the IMPs and digitally multiplying them together in the time domain to create a copy of the IMPs generated in the transmitters and receivers. While each implementation of the IMP cancellation process is a little different, they are all based on the same IMP cancellation patents pending for patent application Ser. No. 11/851,185, filed Sep. 6, 2007, which is now U.S. Patent Publication No. 2009/0068974 published Mar. 12, 2009, which is incorporated herein.

It should be noted that while the description herein concentrates on 3rd order IMPs, as one versed in the arts will recognize, the invention is readily extensible to any order IMP by the correct selection of the source signals and multiplying these signals together in the time domain in the correct combinations. 3rd order IMPs are usually, but not always, the most problematic and so are discussed here for demonstration purposes.

The IMP cancellation is executed in the digital domain and is performed in such a manner that it only needs to be concerned with the large signal components. The invention does not need to be concerned with the fine grained structure, modulation or the internals of any signals. The techniques are modulation agnostic. In the digital IMP cancellation process, 6 dB of IMP suppression is realized for each bit of accuracy.

If the process in accurate to 4 bits, then 24 dB suppression of the IMP will be achieved. This process is not limited to 4 bits of accuracy, and depending on the environment and implementation chosen, greater accuracy is possible. For demonstration and discussion, 4 bits will be assumed herein, but this is not intended be a limitation. The process will be described in detail.

The Techniques Presented Here Provide the Following Functions and Benefits:
1. Non-linear pre-distortion to mitigate AM/AM and AM/PM and digitally pre-clipping and filtering to prevent signal compression and side-lobe re-growth (also supports multi-amplitude signals when this invention is implemented in conjunction with patent application Ser. No. 10/603,798, filed Jun. 24, 2003.
2. Cancellation of passive and active transmitter IMPs allowing multi-carrier operation in non-linear systems
3. Cancels IMPs in the receivers caused by transmitter feed thru generated IMPs
4. Cancellation of IMPs caused by higher power co-located transmitter signals mixing in the receiver band
5. Cancellation of passive IMPs generated in co-located transmitters.

In the sections that follow, the different sources of IMPs and OOBE interference will be discussed along with their associated impact. Then the interference suppression technique will be discussed along the benefits of the interference suppression. All of the techniques described herein can be implemented individually or simultaneously.

Multiple IMPs from multiple signals can be cancelled simultaneously because all IMPs are uncorrelated as has been proved by stochastic processes in another paper. The IMPs can be co-channel (occupying the same frequency of the signal of interest) and can be wider than the signal of interest and can be much higher power. This technique is not a notch filter and does not remove energy from the signal of interest. The IMP suppression is a direct digital cancellation of the IMP in real and continuous time.

Intermodulation Products (IMPs), Side Lobe Re-Growth (OOBE)

The interference and interference mitigation discussion will begin with the high power transmitter active and passive IMPs. IMP cancellation in the receiver is covered in Patent application Ser. No. 11/851,185, filed Sep. 6, 2007, which is now U.S. Patent Publication No. 2009/0068974, published Mar. 12, 2009.

The transmitter architecture for mitigation of AM/AM and AM/PM and side lobe re-growth prevention will then be discussed. The receiver IMP suppression will be covered. Receiver options for co-location interference mitigation will then be presented.

High Power Transmitter Generated IMPs, Active and Passive

High Power Transmitter Active IMPs

Figure 1:
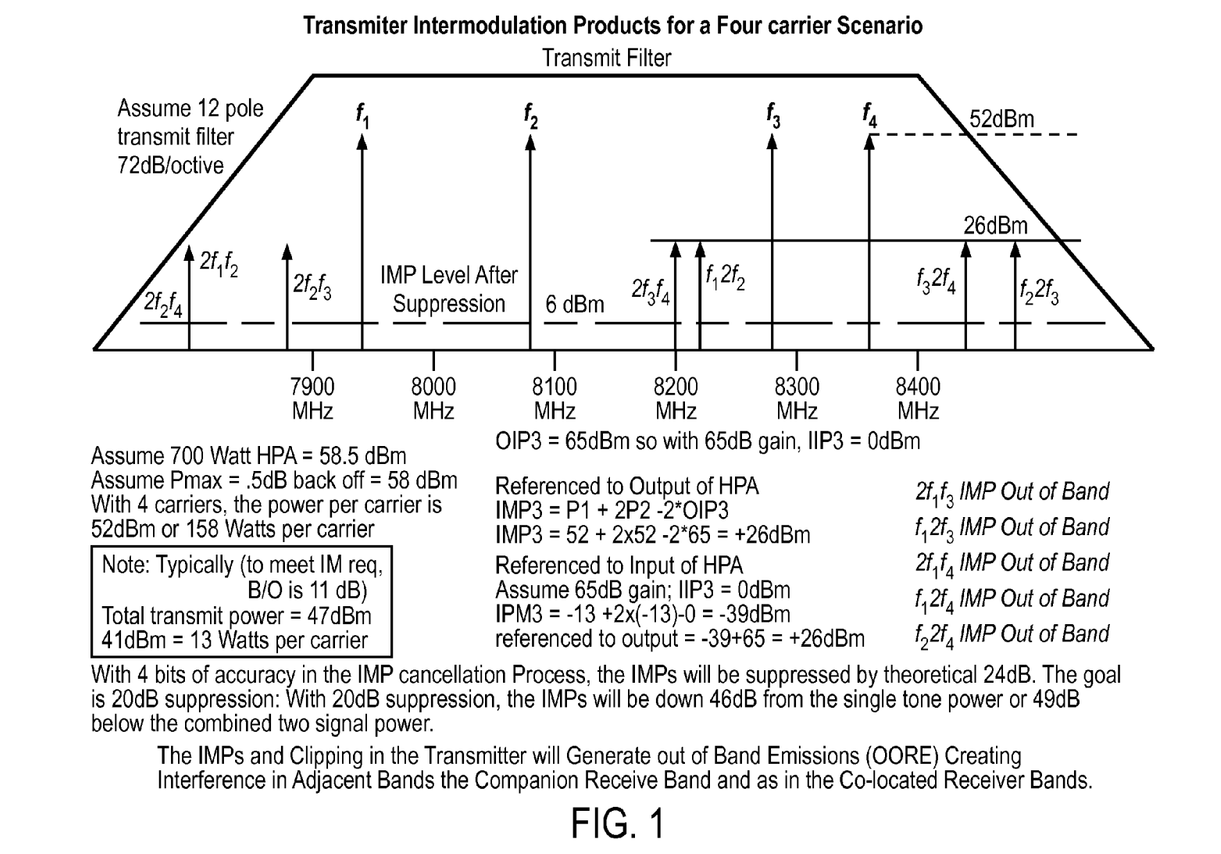
FIG. 1 shows the IMPs and clipping in the transmitter will generate Out of Band Emissions (OOBE) creating interference in adjacent bands the companion receive band and as in the co-located receiver bands.

FIG. 1 shows an example of how a multi-carrier transmitter can generate unwanted IMPs across the transmitter and receiver bands, potentially jamming on orbit satellite receivers and co-located ground receivers. To preclude this self jamming and jamming of other receivers, MIL-STD-188-165A imposes limits on the transmitted IMPs and out of band emissions (OOBE). The ground transmitter back off is typically on the order of 6 to 12 dB for multi-carrier systems.

The MIL-STD-188-165A requirements for SATCOM Terminals are specified for the bands shown in Table 1. The satellite bands include C, X, Ku and Ka and will soon include Q band. As an example of the concept and the approach, the X-band example will be presented, but the analysis applies to any bands.

X-band is the most susceptible to transmitter feed thru to the receiver due to the narrow guard band between the companion transmit and receive bands. This creates a particularly difficult problem with passive IMPs.

The maximum linear power and the level of IMPs generated determine the maximum transmitter operating power for a multi-carrier system. If the IMPs generated by the transmitter can be suppressed by 20 dB, then the EIRP of the transmitter can be raised by 6+dB as shown in the example below.

FIG. 1 shows the four carrier intermodulation products case. For the two carrier case which will be discussed below, the input power of the transmitted signals creating the IMPs are: IP1=IP2=58−3=55 dBm. The OIMP3 referenced to the HPA output will be 3(55)−2×65=+35 dBm. This will be discussed in detail below.

Definitions: MIL-STD 188:
Transmitter maximum linear power
  Single carrier terminal
    Power at which side lobe energy is 30 dB below the SPD at the center frequency
  Multi-Carrier Terminals
    The sum of the power of two signals where in the 3rd order IMP is 25 dB below the combined power of the two signals
The transmitter power shall be measured for the Pmax
  Pmax is defined at the 10:1 compression point (typically about Psat −0.5 to −1.5 dB)
Pmax is the combined power of the two tones
  Pmax IMP<−14 dBc see FIG. 2 purple line (201)
  Pmax-3 dB IMP<−19 dBc see FIG. 2 bright green line (202)
  Pmax-6 dB IMP<−25 dBc see FIG. 2 gold line (203)

It should be noted here that while SATCOM applications are the focus of this discussion to describe the functions and benefits of this invention, it is not intended to limit the application of this invention. This invention is applicable to any type of non-linear transmitter to include terrestrial communications and mobile wireless communications for both fixed and mobile units. It is also applicable to wired and cable applications. It should also be noted that while this discussion talks about 3rd order IMPs, since they are typically the most problematic, this invention is readily extended to any order IMP.

Multi-Carrier Transmitters

Figure 2:
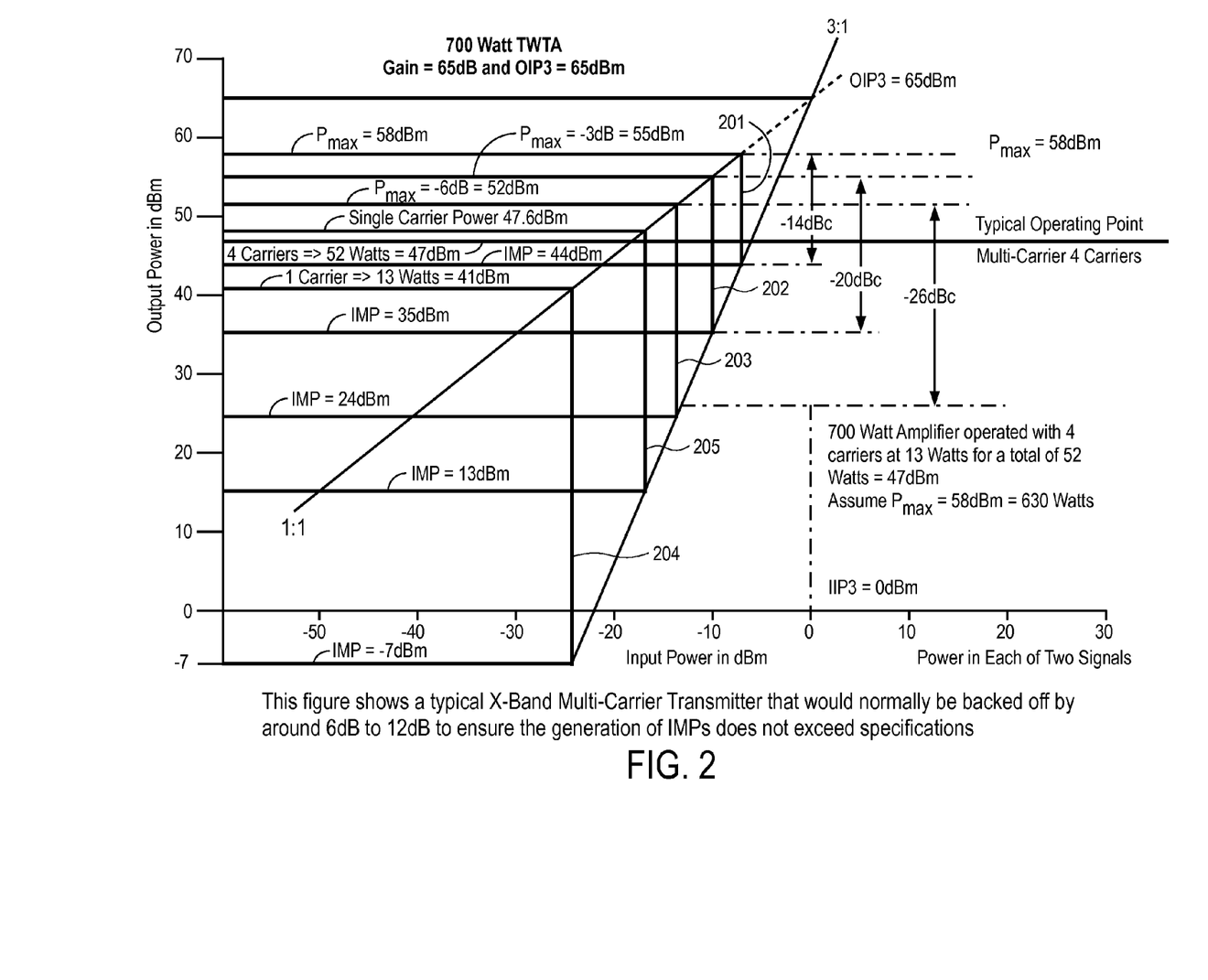
FIG. 2 shows a typical X-Band Multi-Carrier Transmitter that would normally be backed off by around 6 to 12 dB to ensure the generation of IMPs does not exceed specifications.

The next part of the discussion will examine a typical multi-carrier SATCOM ground terminal. Typical HPA amplifier characteristics for the power input versus power output and the third order IMPs are shown in FIG. 2. This is a typical example of a ground terminal and others implementations will vary, but the overall concepts are still applicable and the values are reasonable. As shown in FIG. 2, the graphical solution for the 3rd order IMP is based on the power of a single carrier, not the sum of the two carriers. For the case of Pmax at 58 dBm, the sum of the two carriers is 58 dBm and the power of each carrier is 55 dBm. From the graphical solution, it can be seen that the IMP is 35 dBm which is 23 dB below the two power total or −20 dBc (below the single carrier). The specification above requires that the IMP be −14 dBc. If the two carriers are at 58 dBm, then the IMP is at 44 dBm or −14 dBc. With two carriers, there are actually four 3rd order IMPs, at 2f1+f2 and 2f2+f1. The total power in the IMPs is 6 dB higher than for one IMP which is shown in FIG. 2 and this gets us from −20 dB to −14 dB. In reality, there are additional IMPs, but 3f1 and 3f2 are out of band and 2f1−f1 and 2f2−f2 fall on top of f1 and f2 but are very small compared to f1 and f2. The end result of this is that the specification is conservative. With IMP suppression, the HPA can be operated with very little if any back off and in a very non-linear region.

The power in the $3^{rd}$ order IMPs can be taken from the graph (FIG. 2) or computed by using the following:

IIMP3(dBm)=ISP$_1$(dBm)+2×ISP$_2$(dBm)−2×*IIP*3(dBm) where:

IIMP3=the power in the $3^{rd}$ order IMPs referenced to the input of the amplifier; when referenced to the output, OIMP3=IIMP3+Gain of amplifier ISP$_1$(dBm)=power in signal used once in creation of the $3^{rd}$ order IMP referenced to the input of the amplifier ISP$_2$(dBm)=power in signal used twice in creation of the $3^{rd}$ order IMP referenced to the input of the amplifier IIP3=$3^{rd}$ order intercept point referenced to the input of the amplifier The same equation can be used to reference all signals to the output of the amplifier OIMP3(dBm)=1(OSP1 dBm)+2(OSP2 dBm)−2(OIP3 dBm)=output 3rd order IMP OSP1(dBm)=power in signal used once in creation of the 3rd order IMP referenced to the output of the amplifier OSP2 (dBm)=power in signal used twice in creation of the 3rd order IMP referenced to the output of the amplifier OIP3=3rd order intercept point reference to the output of the amplifier Example IMP Scenario For this example, the gain is assumed to be 65 dB and the OIP3 is 65 dBm so the IIP3 is 0 dBm.

In this example, we assume 4 carriers with an output power of 13 watts each for a total of 52 watts or 47 dBm from a maximum power output of 700 watts (58.5 dBm) and a Pmax of 58 dBm. (Note: This amplifier would most likely require phase coherent power combining of two or more TWTAs). In this case, the OSP1 and OSP2 would be at 13 watts or 41 dBm, or an input of −24 dBm (ISP). The output IMP would be:

OIMP3=3(41)−2(65)=−7 dBm referenced to the HPA output

If referenced to the amplifier input,

IIMP3=3(−24)−2(0)=−72 dBm=>−72 dBm+65 dB gain=−7 dBm=*OIMP*3:

See FIG. 2, 204

Maximum Linear Power as Defined by MIL-STD-188/165A

If we ignore the multiple IMPs and just use the definition of a single IMP level below the single carrier, then the maximum linear power is defined as the power at which each of the IMPs is −25 dBc. In the case shown in FIG. 2, without IMP suppression, the maximum linear power is about 52 dBm (FIG. 2, 203), as described above. In this case, the power in each carrier will 49 dBm for a total power of 52 dBm.

If we assume that Pmax=58 dBm, with two carriers, the power in each carrier will be 55 dBm. If the IMPs generated by the 55 dBm carriers are suppressed by only 10 dB, they will be at 35 dBm−10 dB=25 dBm or −30 dBc and the maximum linear power will be at saturation and will yield a 6 dB EIRP advantage or the ability reduce the size of the amplifier by a factor of 4. IMPs can be suppressed by approximately 20 dB+.

Four Carrier Transmitter Case

In FIG. 2, for the 4 carrier case, (as shown with the solid line 204) at a total transmit power of 47 dBm (multi-carrier system) the IMPs at the output can be expected to be about −7 dBm (single carrier power of 41 dBm). To meet the same IMP performance (with IMP suppression), the four carrier transmit power could be 53.6 dBm total power with a two carrier total power of 50.6 dBm and each signal at 47.6 dBm (for each of 4 signals) (FIG. 2, line 205) (for the graphical solution) with the IMP prior to suppression at 13 dBm and −7 dBm with 20 dB suppression. This is a 6.6 dB improvement in EIRP for the same amplifier. Single carrier systems can now be multi-carrier. In the case shown, a 6.6 dB higher EIRP could be realized or an amplifier ¼ the size could be used.

Prior to IMP suppression: OIMP3=3(47.6)−2(65)=13 dBm (FIG. 2, line 205)

After IMP suppression, OIMP3=13−20=−7 dBm (same as FIG. 2, bottom line 204)

In the four carrier case, if the amplifier is operated at saturation (no back off), each carrier will be at 58−6 dB or 52 dBm. The IMPs prior to suppression will be at 44 dBm and at 24 dB after suppression. This puts them at −31 dBc (55−24) for the combined power of two signals and this meets the requirement for maximum linear operation with NO back off. In this case an 11 dB (47 dBm versus 58 dBm) advantage in the amplifier or a reduction by a factor of 12 in size of the amplifier is available.

If the IMP cancellation process is accurate to the 4 MSBs, then 24 dB suppression of the IMPs will be realized and the IMPs will be at 44 dm−24 dB=20 dBm or −32 dBc for a single carrier and −38 dBc for the total power.

As will be shown below, residual IMPs from the transmitter and from the receiver LNA can be suppressed by up to 20 dB+ in the receiver. The IMP cancellation is done digitally in both the transmitter and the receiver and for every bit of accuracy, the IMPs are suppressed by 6 dB. The process is self adapting and is not dependent on any make or model of HPA or LNA.

High Power Transmitter Active Feed Thru IMPs

As shown in FIG. 1, the transmitter filter will typically suppress most of the IMP energy that falls out of band of the transmitter, but possibly not all of the energy will be suppressed. If we consider a typical X band LNA, say a MITEQ JPW4-07250775-45K-S, we will see a gain of 40 dB and an OIP3 of 17 dBm yielding an IIP3 of −23 dBm. If the transmitter IMPs are at 20 dBm and the transmitter filter reduces them by 72 B, then the power is still at −52 dBm. If the signal of interest in the receiver is −120 dBm and the LNA generated IMP referenced to the input of the LNA is:

IMP3=3(−52)−2(−23)=−110 dBm everything referenced to the input of the LNA:

=>Transmitter feed thru IMPs could be a problem.<=

If the passive IMPs become source signals for IMPs in the receiver, the IMP cancellation will be done as described in patent application Ser. No. 11/851,185, filed Sep. 6, 2007, which is now U.S. Patent Publication No. 2009/0068974 published Mar. 12, 2009.

High Power Transmitter with Passive IMPs

Figure 3:
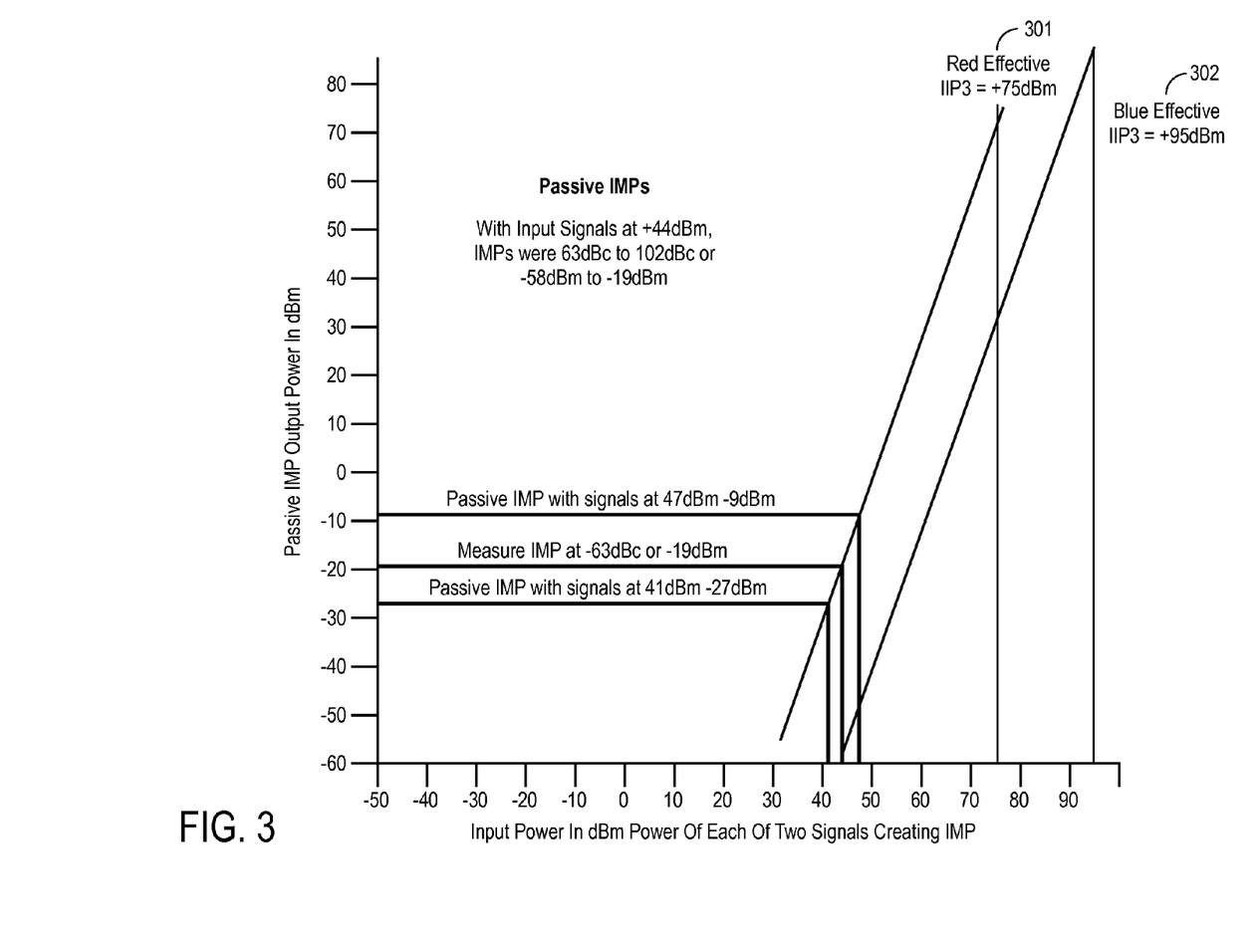
FIG. 3 shows passive IMPs Curves—Measured Data, with high and low range.

However, there other even higher power sources of IMPs that can fall in-band of the receiver when that guard band between the transmitter and receiver is small. With high power signals, passive IMPs can be generated in the wave guide and antenna components and these can fall in-band of the receiver. When the receiver requires high quality sensitivity for low level signals, passive IMPs can create problematic interference. FIG. 3 shows the plot of the range of passive IMPs that can be generated. The high power transmitter noise floor can cause OOBE interference in the companion receiver where the noise energy can mix with signals in the receiver creating more receiver IMPs. This is addressed in the receiver section.

To determine a reasonable range of IIP3 values for passive IMPs, the Narda West Applications Notes on "Passive Intermodulation Distortion in Filters and Ferrites" was used. With carrier signals at +44 dBm, the measured passive IMPs ranged from −63 to −102 dBc.

Using the formula for active IMPs, the IIP3 can be estimated from:
IIMP3(dBm)=IP1(dBm)+2×IP2(dBm)−2×IIP3(dBm):
In this situation, there is no gain so the IIP3=OIP3.
The range of IIP3 values can be computed from the power in the IMPs at −63 and −102 dBc;
44-63 dBm=−19 dBm and 44-102 dBm=−58 dBm
−19 dBm=3(44 dBm)−2(IIP3)=>IIP3=75 dBm at the low range Red Line FIG. 3 (301)
−58 dBm=3(44 dBm)−2(IIP3)=>IIP3=95 dBm at the high range Blue Line FIG. 3 (302)

Given these values, FIG. 3 provides a graphical solution to the magnitude of the passive IMPs. Note that the horizontal axis is the total power of each of two signals generating the passive IMP.

Passive IMP Measurements

Given the range of power available in an active 4 carrier transmitter, (47 dBm) each carrier at 41 dBm, without IMP suppression the passive IMPs could range from:
IMP3=3(41 dBm)−2(75 dBm)=−27 dBm=>low IIP3;
IMP3=3(41 dBm)−2(95 dBm)=−67 dBm=>high IIP3;
Given the range of power available in an active 4 carrier transmitter, (53 dBm) each carrier at 47 dBm, the passive IMPs could range from:
IMP3=3(47 dBm)−2(75 dBm)=−9 dBm=>low IIP3;
IMP3=3(47 dBm)−2(95 dBm)=−49 dBm=>high IIP3;
With 20 dB suppression of the passive IMP in the receiver, the range of the passive IMP3 would be −29 dBm to −69 dBm By using clean high resolution copies of the source signals from the transmitter and creating the ICS for the passive IMPs with greater resolution, it is possible to get a cancellation signal accurate to around 6 bits which would provide 36 dB suppression of the passive IMPs. This would result in residual passive IMPs from −45 dBm to −85 dBm. For each dB of back off in the transmitter, the 3rd order IMPs will drop 3 dB. While in the case of the passive IMPs, some back off may be required, it will be far less than without passive IMP suppression.

For the high power non-linear case with 20 dB IMP suppression, the signal power in the companion receiver band would range from −79 dBm to −119 dBm. This is assuming only 3 and ½ effective bits in the IMP cancellation process. If we assume a signal of interest (SOI) at 2 MHz bandwidth with a noise figure of 6 dB and a required SINR of 6 db, the receiver sensitivity will be −99 dBm. Depending on the range of the passive IMPs, the receiver sensitivity could be fully recovered, or at worst case the de-sensitization of the receiver would be minimized.

Suppression of Transmitter Generated Active and Passive IMPs.

The suppression of active and passive IMPs is achieved by using copies of the signals to be transmitted to generate an IMP cancellation signal (ICS) which is input to the transmitter and it then cancels the transmitter generated IMP and is itself cancelled.

The digital copies of the signals to be transmitted are multiplied together sample by sample in continuous real time to create the required IMP cancellation signal. Knowledge of the frequencies and bandwidths of the transmitter signals provides the information required to predict the active and passive IMPs that will need to be cancelled. This is shown in FIG. 1. The passive IMPs that fall within the receiver pass band will be cancelled in the receiver using copies of the transmitted signals and using the invention described in patent application Ser. No. 11/851,185, filed Sep. 6, 2007, which is now U.S. Patent Publication No. 2009/0068974 published Mar. 12, 2009.

It should be noted that the numerical values used in the system descriptions below are only for illustrative purposes and are not to be considered to limit the scope of this invention. For each application, the numbers may vary, but to one versed in the arts, the numerical values used here for descriptive purposes do not detract from the general applications of the invention.

Figure 4:
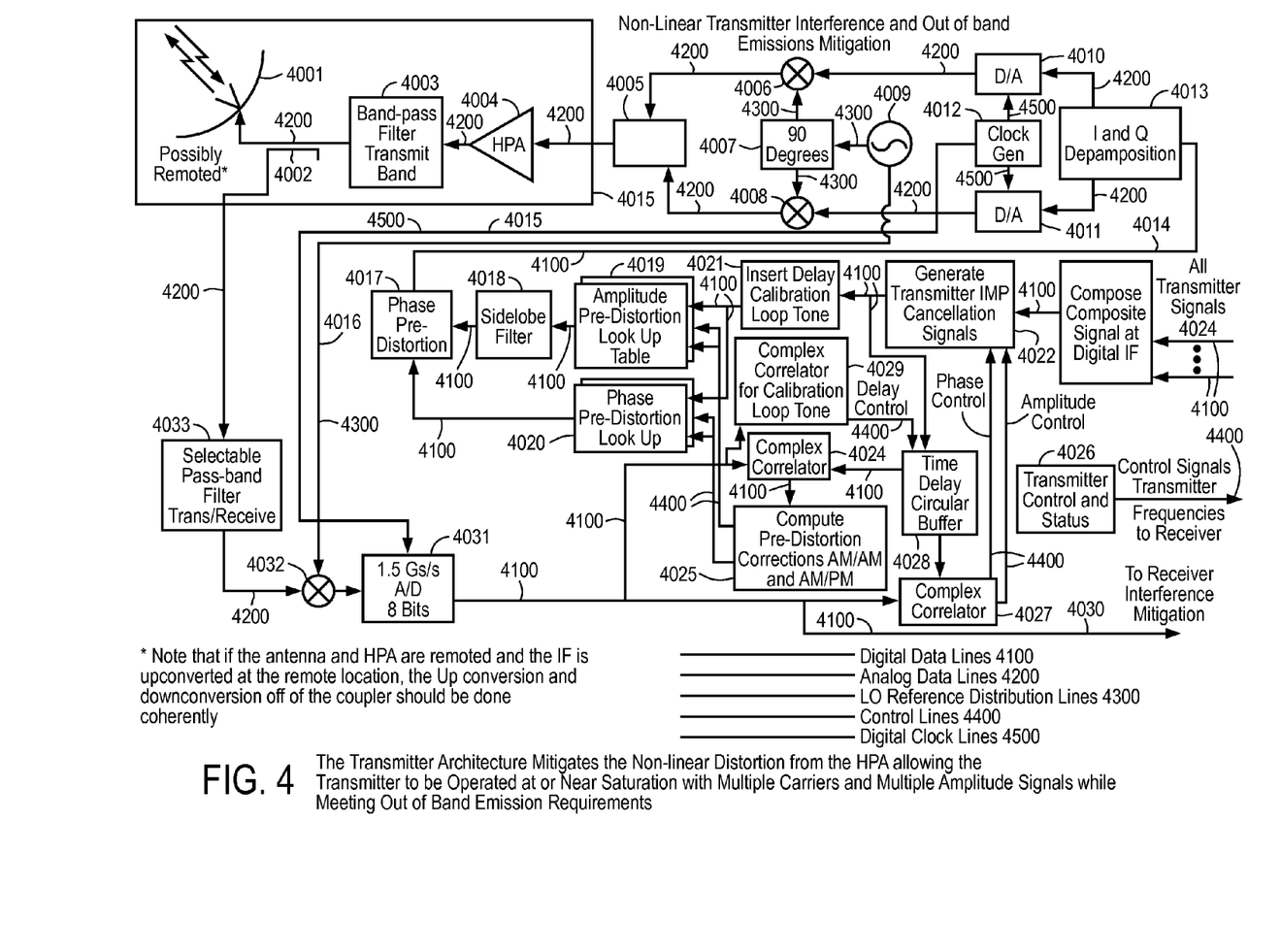
FIG. 4 shows the transmitter architecture mitigates the non-linear distortion from the HPA allowing the transmitter to be operated at or near saturation with multiple carriers and multiple amplitude signals while meeting out of band emission requirements.

FIG. 4 shows the top level transmitter block diagram for mitigating transmitter generated IMPs and for other non-linear distortion to be covered later. In this section, the active and passive IMP suppression will be covered. FIG. 4 will be referenced again when the AM/AM and AM/PM and Side Lobe Re-growth Mitigation is covered.

The Transmitter Active IMP Cancellation

The transmitter Active IMP Cancellation process generates the estimate of the IMP Cancellation Signals (ICS) and adds an inverted copy of the ICS to the digital composite of the signals to be transmitted, prior to the D/A converter. When the IMPs are generated in the HPA they cancel and are cancelled by the ICS. In FIG. 4, the top level architecture of the transmitter with the IMP cancellation process is shown.

The individual digital signals, 4024, to be transmitted, are received in block 4023 where they are digitally combined and block converted to a digital IF or digitally up converted and then combined. In 4022, the ICS signals are created in one of two ways. If the transmitter will have only a few signals, then the individual signals are digitally multiplied together to create the ICS signals and these are inverted and added to the composite signal (or phase shifted by 180 degrees). The IMPs will be on the order of several 10s of dBs below the original signals and will not impact the total drive level.

If there are a large number of small signals creating an IMP floor, then the composite digital signal samples from 4023 are cubed and the result filtered to pass only the signals that will be in the passband of the transmitter. The ICS signal(s) will be cancelled by IMPs generated in the HPA, but not perfectly at first. A calibration loop will perform a cross correlation of the ICS and the HPA output and then the phase and amplitude of the ICS(s) is/are adjusted to minimize the cross correlation.

This cross correlation process can be used in parallel cells to control the ICS signals for multiple IMPs simultaneously because all IMPs are uncorrelated even if they are dependent (i.e. have a common source signal—this can be proved by stochastic analysis).

The RF transmitted signal set, with IMPs and ICSs, is filtered by the transmit filter 4003 and output to the antenna. At the output 4003, a RF coupler, (say 30 dB) samples the transmit signal and down converts it coherently (with the mixer 4032) and the sampled signal is then digitally sampled in the A/D 4031. A medium resolution 8 bit A/D samples the transmitter output to recover the transmitter signal plus residual IMPs and ICSs. This provides 48 dB of instantaneous dynamic range for recovering the residual IMPs and ICSs. If they are below this level, they are no longer of concern. Note: in most applications, 4 or 5 bits will be more than adequate.

Sometimes, a time correlation aid signal is required to align the transmitter signals and the calibration signal from the signal path 4002, 4031 and 4032. In this case, a tone is inserted in the transmitter signal set, (block 4021), to be used to align the delayed copy of the transmit signal set from 4021 and the calibration signal from 4031.

A circular buffer 4028 provides for macro delay calibration for the signals paths between the output of 4021 or 4022 and the output of 4031. This is a calibration to within one sample time and final adjustment is done in 4022 to a sub-sample time with a simple adaptive 3 tap FIR filter.

The ICS signal and the output of the transmitter 4031 are cross correlated and the phase and amplitude of the ICS are adjusted in 4022 until the cross correlation in 4027 is at a minimum, which is the optimum for the cancellation. 4027 sends amplitude and phase control signals to 4022. The ICS is a four to eight bit signal and if we are accurate to 4 bits, the IMPs are suppressed by 24 dB.

The transmit filter will suppress IMPs outside of the transmitter passband, but passive IMPs can be generated in the wave guide and antenna components and these can fall in band of the receiver. The sampled transmit signal from 4031, signal 4030, is sent to the receiver where the high power transmit signals are used to generate the passive ICS(s) in the same manner as described for the receiver IMPs above.

The Transmitter Passive IMP cancellation

These IMPs are cancelled in the receiver and use the copies of the transmitter signal set in data set 4030 as shown in FIG. 4 and described in detail in patent application Ser. No. 11/851,185, filed Sep. 6, 2007, which is now U.S. Patent Publication No. 2009/0068974 published Mar. 12, 2009.

Receiver IMPs

Active Receiver IMPs

When all receiver signals are about the same strength (within 6 or so dB), the IMPs will typically not be a problem unless there is a very large number of signals, in which case an IMP floor can be generated. When there is a significant difference in receive signal strengths, the high power signals can generate significant IMPs.

Embodiments of this invention can mitigate individual IMPs or an IMP noise floor. In the X-band case, the very large terminals can be impacted by signals transmitted from the satellite to small terminals. If a 60 foot ground terminal is in the same foot print as a 6 foot terminal, the signals can be 20 dB higher to achieve the same receive signal strength as shown in FIG. 5 for signals at −65 and −45 dBm where the IMP is 3 dB below the SOI.

Figure 5:
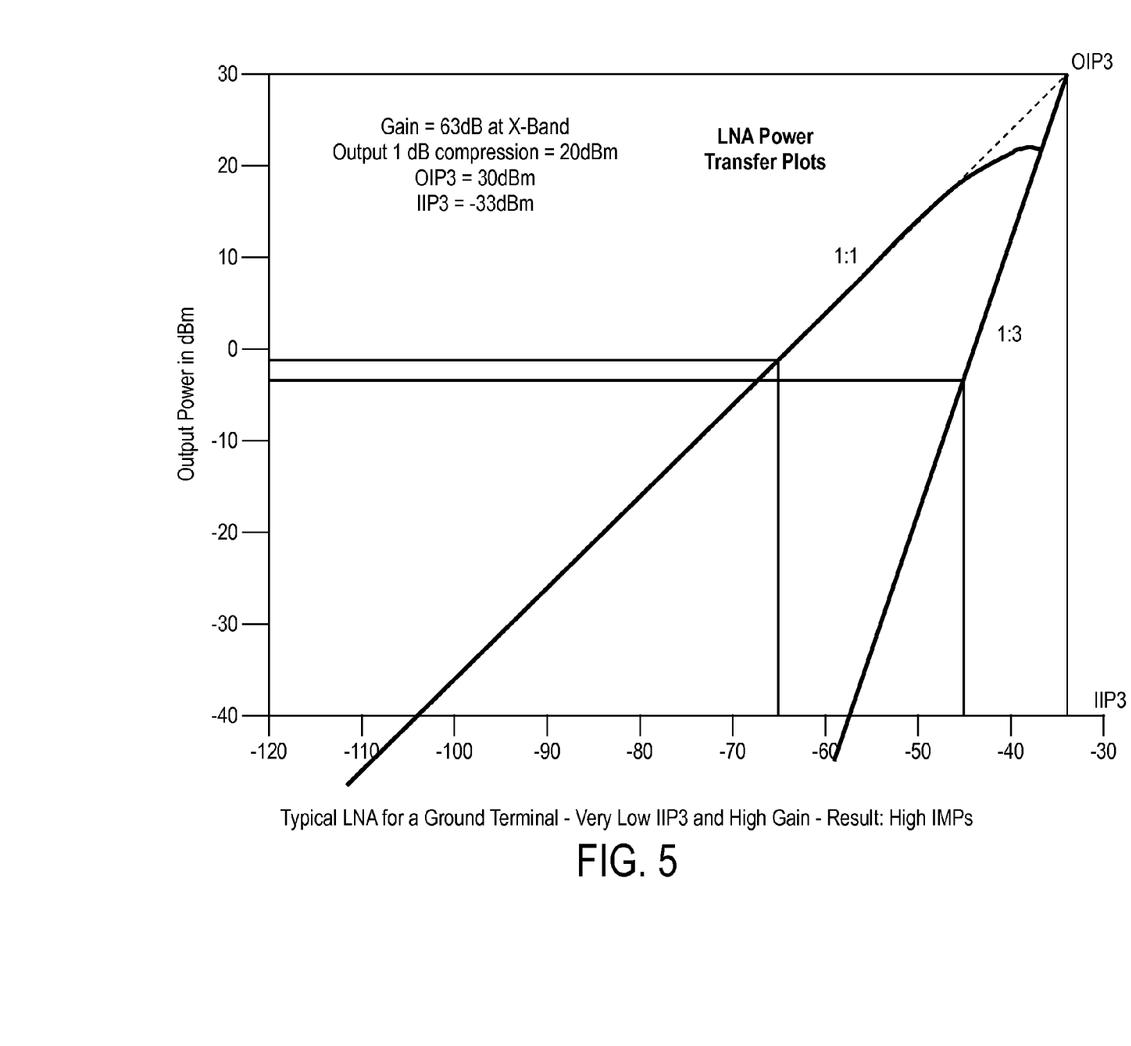
FIG. 5 shows a typical LNA for a ground terminal—very low IIP3 and high gain-result: high IMPs.

For the case in FIG. 5, the gain is 63 dB and the OIP3 is 30 dB, so the IIP3 is −33 dBm. For the case of interfering signals at −65 dBm, the IIMP3 is (referenced to the input)

IIMP3=3(−45)−2(−33)=−69 dBm

Passive IMPs From Transmitter in Receiver Band

As discussed above, passive IMPs can be as high as −9 dBm. In this case, they not only create interference of their own, but can also generate significant IMPs by mixing with other signals in the LNA.

As shown in FIG. 5, the LNA of a typical SATCOM ground terminal will have very high gain and a low IIP3. When high power signals are in the passband of the receiver, the LNA can generate IMPs as a result of mixing in the LNA. In multi-carrier satellite communications systems, FDM signals can transmitted to multiple ground terminals with varying power levels depending on the G/T of each receive terminal.

A disadvantage terminal will require a high receive signal strength to achieve the same signal strength into the receiver (receiver sensitivity requirements). If a 60 foot terminal in is the same ground foot print as several small terminals around 6 ft, there will be a 20 dB difference in the receive signal strength of each FDM signal. In this case, the large terminal could become the disadvantaged terminal due to IMPs as shown in FIG. 5. If the target receive signal of the large terminal is −65 dBm and for the small terminals they are −45 dB, the result can be an IMP at −69 dBm as seen by the large terminal as referenced to the input of the LNA.

Receiver Cancellation of Active and Passive IMPs

The IMP cancellation technology is a digital implementation wherein copies of the signals that generate the IMPs are isolated and digitally multiplied together to create a copy of the system generated IMP which is then used to cancel IMPs in continuous real time. The cancellation signal is subtracted from the signal of interest (SOI) and the result is cross correlated with the cancellation signal. The phase and amplitude of the cancellation signal are adjusted continuously to minimize the cross correlation, thus maximizing the cancellation process.

The IMP cancellation in the transmitter and the receiver are fundamentally the same concept, but implemented somewhat differently as described in patent application Ser. No. 11/851,185, filed Sep. 6, 2007, which is now U.S. Patent Publication No. 2009/0068974, published Mar. 12, 2009.

Figure 6:
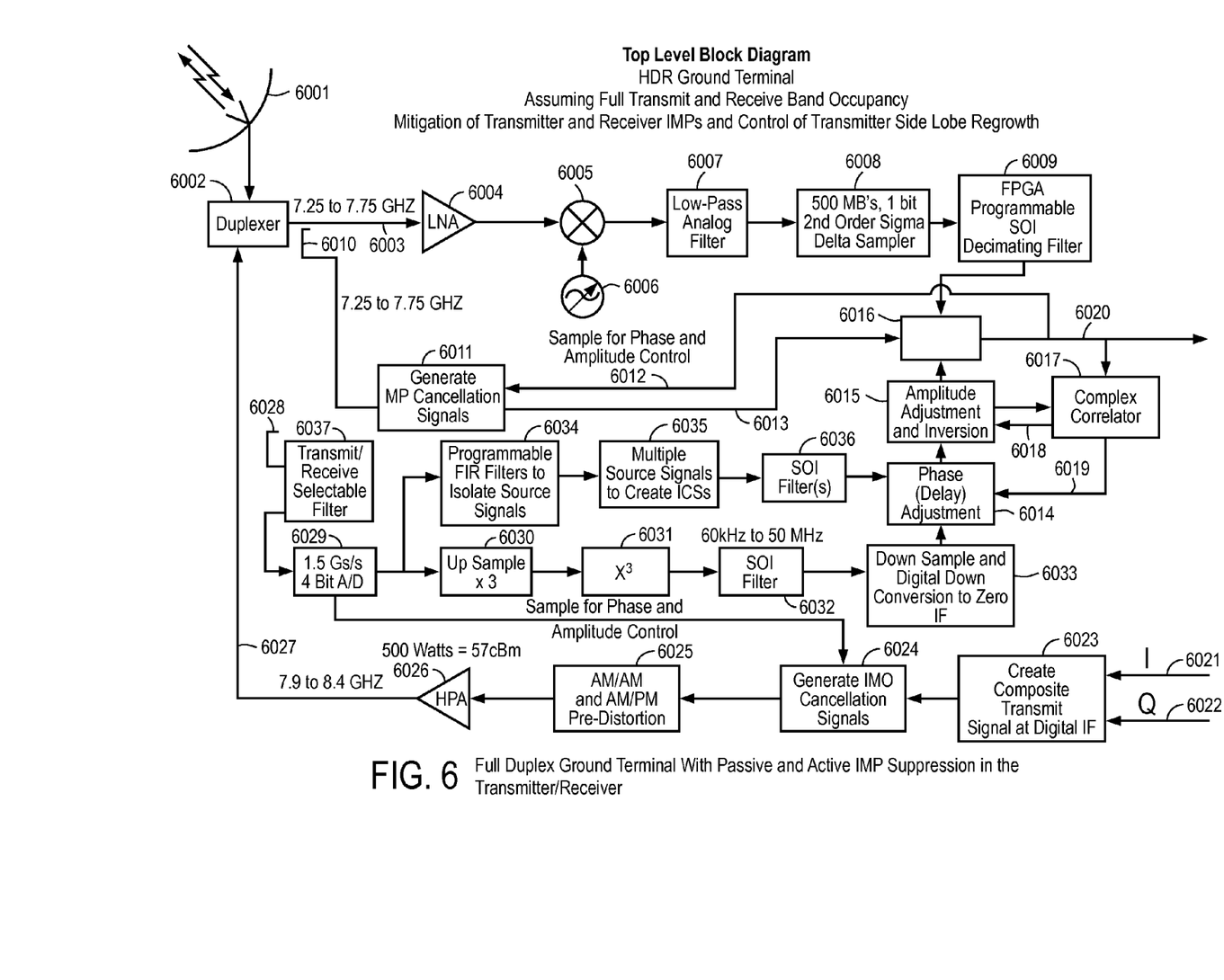
FIG. 6 shows a full duplex ground terminal with passive and active IMP suppression in the transmitter/receiver.

There are three basic variations on the process at work here as shown in FIG. 6.

IMPs Generated in the Transmitter Passband

In 6021/6022, the digital signals are input to the transmitter to create a composite digital IF with all of the signals to be transmitted. In 6024, copies of the individual signals are used to generate copies of the IMPs that will be generated in the HPA. These are the ICSs. They are inverted and added digitally to the composite transmit signal. In 6025, the composite signal is pre-distorted for AM/AM and AM/PM and digitally clipped and filtered to preclude clipping and side lobe re-growth. At the output of the HPA, a 30 dB or so coupler 6028/6029 samples the signal inputs the digital signal to 6024 where it is cross correlated with the IMP cancellation signals. The phase and amplitude of the IMP cancellation signals are adjusted to minimize the correlation.

Passive IMPS Generated in the Wave Guide and Antenna that Fall in Band of the Receiver At the A/D 6029, the digital signal is sent to the receiver also. The down converted signal is used to generate IMP cancellation signals (from the transmitted signals for the passive IMPs) in blocks 6030 and 6031. They are then filtered to pass only IMPs within the receiver SOI passband.

If there are co-site interference signals that can mix with the transmitter signals, these are sampled with an omni antenna at the input of the antenna and then processed with the transmit signals to generate IMP cancellation signals for the passive IMPs. The cancellation process is the same a described for other IMPs.

In one embodiment of this invention, selected signals from the block 6029 are filtered and multiplied together to create the ICSs for cancellation of the passive IMPs in block 6016. The sampled signal from 6029 is filtered with programmable FIR filters to isolate source signals in the transmit signal that can generate passive IMPs in the transmitter chain. These signals are multiplied together sample by sample in real and continuous time to create the 1 or more ICSs for cancellation of passive IMPs in block 6016.

At the output of the summing block, 6016 the signal is sampled (signal 6020) which is input to the complex correlator 6017 where it is cross correlated with the ICS signal from 6015. The complex correlator 6017 sends control signals 6019 and 6018 to 6014 and 6015 to adjust the phase and amplitude of the ICSs until the correlations are at a minimum. When the ICSs and the IMPs cancel each other, the cross correlation goes to zero near zero.

IMPs Generated in the Receiver Analog Components

The full passband of the receiver is sampled with a coupler and an A/D at the input to the LNA, at low resolution, around 4 bits this is done in 6011. The signals that generate IMPs in the receiver are digitally filtered and used to generate IMP cancellation signals and the IMPs are cancelled in 6016. The calibration and adjustment of the phase and amplitude of ICSs from 6011 are done in the same manner as described in blocks 6028 through 6036 and blocks 6014 through 6016.

Transmitter Active IMP Cancellations From Transmitted Signals

In one embodiment of this invention, the signal set (signal set 6021 and 6022 and these may be any number of signals) to be transmitted is input to block 6023 where the signals are digitally converted to selected digital IFs. These signals are then sent to 6024 where they are multiplied together to create ICS signals for later cancellation of IMPs generated in the HPA. The ICS signals are digitally inverted and combined with the transmit signal set in 6024 and the output of 6024 is sent to 6025 where the AM/AM and AM/PM and digital signal clipping and side lobe suppression filtering is accomplished as described in patent application Ser. No. 10/603,798, filed Jun. 24, 2003.

In one embodiment of this invention, the combined digital signal set from 6023 is up sampled and cubed to create all possible $3^{rd}$ order IMPs in 6024 and the result is filtered to pass only those IMPs within the transmitter passband and this is a composite ICS signal for all the active transmitter IMPs. The composite ICS is then inverted and added to the transmit signal set and the result is sent to 6025 and then to the HPA 6026.

In one embodiment of this invention, the output of the HPA signal 6027 is sampled with a coupler 6028 and the sampled signal is digitally sampled. The signals that will create the passive IMPs have created copies of those same IMPs in the HPA and in one embodiment of this invention, the passive ICSs are taken directly from 6029 and sent to the passive IMP cancellation process in the receiver and the phase and amplitude of each of these signals is adjusted in the same manner as described above in blocks 6034 through 6036 and blocks 6014 through 6020.

In one embodiment of this invention, the noise floor of the HPA mixes with high power signals and creates IMPs. The sampled signal from 6029 contains a sample of the noise floor. The frequency components of the noise floor that can mix with transmitter signals to create IMPs of sufficient power to be of concern are computed and the programmable FIR filters in 6034 are used to isolate the source signals and then the process continues as described above for blocks 6034 through 6036 and 6014 through 6020.

In one embodiment of this invention, the noise floor of the transmitter feeds through to the receiver. This noise floor is sampled in block 6029. In this embodiment, the sampled signal is filtered with notch filters to remove all signals above the noise floor in the pass band of the receiver and this noise floor signal is then used to cancel the noise floor feed through from the transmitter to the receiver. The phase and amplitude of this noise floor cancellation signal are then adjusted as described in block 6034 through 6036 and 6014 through 6020.

Selectable Filters for the HPA Output Sampled Signal

In one embodiment of this invention, block 6037 in FIG. 6 consists of a transmitter/receiver selectable filter bank in which the selected filters can pass one of three signals, the pass band of the transmitter, the pass band of the receiver or the combined pass band of the transmitter and the receiver. Depending on which of these filters is selected, the sampled signal set provides the feedback signals for the active IMP cancellation or the passive IMP signals in the receiver.

If the transmitter pass band is selected, the signal is used to calibrate the active IMP cancellation process in the transmitter. If the receiver pass band is selected, the signal is used to provide passive IMP cancellation signals or the transmitter noise floor feed through cancellation signal or both. If the transmitter and receiver pass band is selected, then both the passive and active IMPs processing can be supported simultaneously as well and the transmitter noise floor feed through cancellation.

In different embodiments of this invention, the sampling rate of block 6029 is selected to ensure that the sampling rate is high enough to satisfy the Nyquist sampling rate for the filter selected in block 6037.

Tables:

TABLE 1

The Proposed IMP Mitigate for MILSATCOM Transmitters and Receivers is Frequency and Modulation Agnostic and is applicable to all of the MILSATCOM and Commercial SATCOM bands of interest

| Ground Terminals SHF Band | Receive Bands (GHz) | Transmit Bands (GHZ) |
|---|---|---|
| C-Band | 3,400 to 4,200 | 5,850 to 6,650 |
| X-Band | 7,250 to 7,750 | 7,900 to 8,400 |
| Ku-Band | 10,950 to 12,750 | 13,750 to 14,500 |
| Commercial Ka-Band | 17,700 to 20,200 | 27,500 to 30,000 |
| Military Ka-Band | 20,200 to 21,200 | 30,000 to 31,000 |

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

The invention claimed is:

1. A method for performing interference cancellation in a receiver, with a transmitter and the receiver being co-located with each other, the method comprising:

generating intermodulation product (IMP) cancellation signals (ICSs) to cancel passive IMPs in the receiver, continuously and near real time, using copies of transmitter signals of the transmitter, wherein the passive IMPs are generated in passive transmitter components of the transmitter and receiver components of the receiver after a high powered amplifier (HPA) and transmitter filter of the transmitter, wherein the transmitter filter is coupled between the HPA and an antenna used by the transmitter, wherein generating the ICSs is based on a power series description of a non-linear process for generating the IMPs, and includes generating an n-th order ICS by, given three signals S1, S2 and S3, digitally multiplying and filtering S1×S1×S2 and S1×S2×S2 and S 1×S2×S3 and S1×S1×S3 and S2×S2×S3 and S1×S3×S3 and S2×S3×S3, where n is an integer.

2. The method of claim 1, wherein the copies of the transmitter signals used in generating the ICSs are digital copies of the transmitter signals.

3. The method of claim 1, further comprising:
capturing transmitter signals as analog signals at a transmitter output; and
down-converting and sampling the captured transmitter signals to create the copies of transmitter signals used in generating the ICSs.

4. A method for cancelling passive intermodulation products (IMPs), comprising:
generating, with a priori knowledge of a transmitter signal set, continuous and real time IMP cancellation signals (ICSs) in a baseband digital signal set of a receiver co-located with a transmitter based on the transmitter signal set, wherein digital copies of the transmitter signal set are passed to the receiver, the passive IMPs are generated in the transmitter and receiver chain after a high power amplifier (HPA) and transmitter filters of the transmitter, wherein the transmitter filters are coupled between the HPA and at least one antenna used by the transmitter, and wherein the transmitter filters are configured to significantly reduce active IMPs in band of a passband of the receiver wherein generating the ICSs is based on a power series description of a non-linear process for generating the IMPs, and includes generating a 3rd order ICS by, given three signals S1, S2 and S3, digitally multiplying and filtering S1×S1×S2 and S1×S2×S2 and S1×S2×S3 and S1×S1×S3 and S2×S2×S3 and S1×S3×S3 and S2×S3×S3.

5. The method of claim 4, wherein the power series description of the non-linear process includes:
generating 5th order ICSs by digitally multiplying two or three or five signals of the transmitter signal set;
generating 7th order ICSs by digitally multiplying two or three or five or seven signals of the transmitter signal set; and
combining these digital signals with the received baseband digital signals to cancel the passive IMPs.

6. The method of claim 5, wherein the power series description of the non-linear process further includes generating even order ICSs by digitally multiplying an even number of the transmitter digital signals and combining these digital signals with the received baseband digital signals to cancel the passive IMPs, and wherein the receiver passband is far enough separated from the transmitter to have even order IMPs fall inband.

7. The method of claim 5, wherein generating the 5th order ICSs comprises:
given up to a set of 5 signals, S1, S2, S3, S4, and S5, digitally multiplying and filtering different combinations of up to the 5 signals.

8. The method of claim 5, wherein generating the 7th order ICSs comprises:
given up to a set of 7 signals, S1, S2, S3, S4, S5, S6, and S7, digitally multiplying and filtering different combinations of up to the 7 signals.

9. The method of claim 4, wherein generating the odd order ICSs comprises:
digitally multiplying and filtering an odd number of digital signals, up to "n" in number, from the transmitter signal set.

10. The method of claim 4, wherein generating the ICSs includes digital multiplication of the transmitter signals in a digital domain with a standard compression model of a nonlinear device model by convolving a composite transmitter signal set with a compression curve function.

11. The method of claim 4, wherein the receiver passband contains passive IMPs generated after the HPA and transmitter filters that fall inband of the receiver, and wherein the residual passive IMPs are detected and used to process a control signal back in the receiver to adjust a phase and amplitude of the digital ICSs to minimize the residual passive IMPs in the receiver.

12. The method of claim 4, wherein the ICSs are cross correlated with a signal of interest after passive IMP cancellation to adjust a phase and amplitude of the ICSs to minimize residual passive IMPs.

13. The method of claim 12, wherein a process function for adjusting the phase and amplitude of the ICSs is to utilize an adjustable finite impulse response filter (FIR).

14. The method of claim 12, wherein a process function for adjusting the phase and amplitude of the ICSs comprises two concatenated functions, one for phase control and one for amplitude control.

15. The method of claim 4, wherein the passive IMPs are cancelled in the co-located receiver by a digital process based on a power series description of the non-linear process in a transmitter hardware chain and is done with one or more ICSs in the receiver, and wherein the nonlinear power expansion is represented by a standard nonlinear amplitude control function or a compression curve.

16. A method comprising:
receiving a digital copy of a transmitter signal at a receiver, the receiver co-located with a transmitter that generates the transmitter signal; and
generating digital passive intermodulation product (IMP) cancellation signals (ICSs) to digitally, continuously and in real time, cancel passive IMPs falling within a receiver passband, the passive IMPs being generated after a high powered amplifier (HPA) and a transmitter filter of the transmitter, wherein the transmitter filter is coupled between the HPA and an antenna used by the transmitter, wherein generating the ICSs is based on a power series description of a non-linear process for generating the IMPs, and includes generating an n-th order ICS by given three signals S1, S2 and S3, digitally multiplying and filtering S1×S1×S2 and S1×S2×S2 and S1×S2×S3 and S1×S1×S3 and S2×S2×S3 and S1×S3×S3 and S2×S3×S3, where n is an integer.

17. A method comprising: creating one or more composite passive intermodulation product (IMP) cancellation signals (ICS s) by digitally multiplying, sample by sample and in real and continuous time, a full passband of a composite digital transmitter signal set with one or more transmitter IMP cancellation signals (ICSs); and filtering the transmitter ICSs to selectively pass ICSs for passive IMP cancellation in a receiver, the receiver co-located with a transmitter, the passive IMP cancellation to cancel passive IMPs generated after a high powered amplifier (HPA) and a transmitter filter of the transmitter, wherein the transmitter filter is coupled between the HPA and an antenna used by the transmitter, wherein generating the ICSs is based on a power series description of a non-linear process for generating the IMPs, and includes generating an n-th order ICS by, given three signals S1, S2 and S3, digitally multiplying and filtering S1×S1×S2 and S1×S2×S2 and S1×S2×S3 and S1×S1×S3 and S2×S2×S3 and S1×S3×S3 and S2×S3×S3, where n is an integer.

18. The method of claim 17, wherein source signals that create the passive IMPs are digitally combined into a combined signal, and the combined signal is convolved with a standard nonlinear compression curve to create the ICSs.

19. The method of claim 17, wherein individual digital baseband ICSs are each individually adjusted in phase and amplitude to minimize a cross correlation between residual passive IMPs generated in analog transmitter components, and wherein the ICS s are further generated from a selected set of signals from the composite digital transmitter signal set.

20. The method of claim 19, wherein in the ICSs are converted to analog signals and used to cancel passive IMPs in the analog domain.

21. An apparatus comprising:
a transmitter;
a receiver co-located with the transmitter; and
circuitry to perform interference cancellation in the receiver, the circuitry configured to:
generate intermodulation product (IMP) cancellation signals (ICSs) to cancel passive IMPs in the receiver, continuously and near real time, using copies of transmitter signals, wherein the passive IMPs are generated in passive transmitter and receiver components after a high powered amplifier (HPA) and transmitter filter, wherein the transmitter filter is coupled between the HPA and an antenna used by the transmitter, wherein the circuitry is further configured to generate the ICSs based on a power series description of a non-linear process for generating the IMPs, and is operable to generate an n-th order ICS by, given three signals S1, S2 and S3, digitally multiplying and filtering S1×S1×S2 and S1×S2×S2 and S1×S2×S3 and S1×S1×S3 and S2×S2×S3 and S1×S3×S3 and S2×S3×S3, where n is an integer.

22. The apparatus of claim 21, wherein the copies of the transmitter signals used in generating the ICSs are digital copies of the transmitter signals.

23. The apparatus of claim 21, wherein the circuitry is further configured to:
capture transmitter signals as analog signals at a transmitter output; and
down-convert and sample the captured transmitter signals to create the copies of transmitter signals used in generating the ICSs.

24. An apparatus comprising:
a transmitter;
a receiver co-located with the transmitter; and
circuitry to cancel passive intermodulation products (IMPs) in the co-located receiver, the circuitry configured to:
generate, with a priori knowledge of a transmitter signal set, continuous and real time IMP cancellation signals (ICSs) in a baseband digital signal set of the co-located receiver based on the transmitter signal set, wherein digital copies of the transmitter signal set are passed to the receiver, the passive IMPs are generated in the transmitter and receiver chain after a high power amplifier (HPA) and transmitter filters, wherein the transmitter filters are coupled between the HPA and at least one antenna used by the transmitter, and the transmitter filters are configured to significantly reduce active IMPs in band of a passband of the receiver, wherein the circuitry is further configured to generate the ICSs based on a power series description of a non-linear process for generating the IMPs, and the circuitry is operable to generate a 3rd order ICS by, given three signals S1, S2 and S3, digitally multiplying and filtering S1×S1×S2 and S1×S2×S2 and S1×S2×S3 and S1×S1×S3 and S2×S2×S3 and S1×S3×S3 and S2×S3×S3.

25. The apparatus of claim 24, wherein the power series description of the non-linear process includes:
generating 5th order ICSs by digitally multiplying two or three or five signals of the transmitter signal set;
generating 7th order ICSs by digitally multiplying two or three or five or seven signals of the transmitter signal set; and
combining these digital signals with the received baseband digital signals to cancel the passive IMPs.

26. The apparatus of claim 25, wherein the power series description of the non-linear process further includes generating even order ICSs by digitally multiplying an even number of the transmitter digital signals and combining these digital signals with the received baseband digital signals to cancel the passive IMPs, wherein the receiver passband is far enough separated from the transmitter to have even order IMPs fall inband.

27. The apparatus of claim 25, wherein, given up to a set of 5 signals, S1, S2, S3, S4, and S5, the circuitry is further configured to:
generate the 5th order ICS s by digitally multiplying and filtering different combinations of up to the 5 signals.

28. The apparatus of claim 25, wherein, given up to a set of 7 signals, S1, S2, S3, S4, S5, S6, and S7, the circuitry is further configured to:
generate the 7th order ICS s by digitally multiplying and filtering different combinations of up to the 7 signals to selectively create the 7th order ICSs.

29. The apparatus of claim 23, wherein the circuitry is further configured to:
generate the odd order ICSs by digitally multiplying an odd number of digital signals, up to "n" in number, from the transmitter signal set; and
filter the results to selectively create nth odd order active ICSs.

30. The apparatus of claim 24, wherein the circuitry is further configured to:
generate the ICS s via digital multiplication of the transmitter signals in a digital domain with a standard compression model of a nonlinear device model by convolving a composite transmitter signal set with a compression curve function.

31. The apparatus of claim 24, wherein the receiver passband contains passive IMPs generated after the HPA and transmitter filters that fall inband of the receiver, and wherein the residual passive IMPs are detected and used to process a control signal back in the receiver to adjust a phase and amplitude of the digital ICSs to minimize the residual passive IMPs in the receiver.

32. The apparatus of claim 24, wherein the circuitry is further configured to:
cross correlate ICSs with a signal of interest after passive IMP cancellation to adjust a phase and amplitude of the ICSs to minimize residual passive IMPs.

33. The apparatus of claim 32, further comprising:
a finite impulse response filter (FIR) to adjust the phase and amplitude of the ICSs.

34. The apparatus of claim 32, wherein a process function for adjusting the phase and amplitude of the ICSs comprises two concatenated functions, one for phase control and one for amplitude control.

35. The apparatus of claim 24, wherein the passive IMPs are cancelled in the co-located receiver by a digital process based on a power series description of the non-linear process in a transmitter hardware chain and is done with one or more ICSs in the receiver, and wherein the nonlinear power expansion is represented by a standard nonlinear amplitude control function or a compression curve.

36. An apparatus comprising:
a transmitter;
a co-located receiver; and
circuitry configured to:
receive a digital copy of a transmitter signal at the co-located receiver; and
generate digital passive intermodulation product (IMP) cancellation signals (ICSs) to digitally, continuously and in real time, cancel passive IMPs falling within a receiver passband, the passive IMPs being generated after a high powered amplifier (HPA) and a transmitter filter of the transmitter, wherein the transmitter filter is coupled between the HPA and an antenna used by the transmitter, wherein the ICSs are generated based on a power series description of a non-linear process for generating the IMPs, and an n-th order ICS is generated by, given three signals S1, S2 and S3, digitally multiplying and filtering S1×S1×S2 and S1×S2×S2 and S1×S2×S3 and S1×S1×S3 and S2×S2×S3 and S1×S3×S3 and S2×S3×S3, where n is an integer.

37. An apparatus comprising: a transmitter; a receiver co-located with the transmitter; and circuitry configured to: create one or more composite passive intermodulation product (IMP) cancellation signals (ICSs) by digitally multiplying, sample by sample and in real and continuous time, a full passband of a composite digital transmitter signal set with one or more transmitter IMP cancellation signals (ICSs); and filter the transmitter ICSs to selectively pass ICSs for passive IMP cancellation in a co-located receiver, the passive IMP cancellation to cancel passive IMPs generated after a high powered amplifier (HPA) and a transmitter filter of the transmitter, wherein the transmitter filter is coupled between the HPA and an antenna used by the transmitter, wherein the ICSs are generated based on a power series description of a non-linear process for generating the IMPs, and a 3rd order ICS is generated by, given three signals S1, S2 and S3, digitally multiplying and filtering S1×S1×S2 and S1×S2×S2 and S1×S2×S3 and S1×S1×S3 and S2×S2×S3 and S1×S3×S3 and S2×S3×S3.

38. The apparatus of claim 37, wherein the circuitry is further configured to:
digitally combine source signals that create the passive IMPs into a combined signal, wherein the combined signal is convolved with a standard nonlinear compression curve to create the ICSs.

39. The apparatus of claim 37, wherein the circuitry is further configured to:
individually adjust, in phase and amplitude, each digital baseband ICSs to minimize a cross correlation between residual passive IMPs generated in analog transmitter components, wherein the ICS s are further generated from a selected set of signals from the composite digital transmitter signal set.

40. The apparatus of claim 39, wherein the circuitry is further configured to:
convert the ICSs back to analog; and
cancel the passive IMPs in the analog domain with the converted ICSs.

* * * * *